United States Patent

Bush

(10) Patent No.: US 8,981,895 B2
(45) Date of Patent: Mar. 17, 2015

(54) METHOD AND SYSTEM FOR INTRUSION DETECTION IN NETWORKED CONTROL SYSTEMS

(75) Inventor: Stephen Francis Bush, Latham, NY (US)

(73) Assignee: General Electric Company, Niskayuna, NY (US)

( * ) Notice: Subject to any disclaimer, the term of this patent is extended or adjusted under 35 U.S.C. 154(b) by 521 days.

(21) Appl. No.: 13/346,194

(22) Filed: Jan. 9, 2012

(65) Prior Publication Data

US 2013/0176132 A1    Jul. 11, 2013

(51) Int. Cl.
| | |
|---|---|
| *G05B 19/00* | (2006.01) |
| *G05D 17/00* | (2006.01) |
| *G06F 17/50* | (2006.01) |
| *G06F 9/00* | (2006.01) |
| *H04L 29/06* | (2006.01) |

(52) U.S. Cl.
CPC .................................. *H04L 63/1416* (2013.01)
USPC .............. 340/5.3; 340/3.1; 340/5.1; 340/657; 703/2; 703/7; 703/18; 703/21; 726/3; 726/11; 726/22; 726/26; 700/291; 700/292; 700/286; 700/295

(58) Field of Classification Search
CPC ... H04L 63/1416; F01K 13/02; F01K 27/005; G05B 19/0426; F03B 13/06; F03B 15/14; H02J 3/06; H02J 3/14; H02J 13/001; H02J 13/0086; Y04S 20/224; G06Q 50/06; G06F 11/3612
USPC .............. 340/657; 700/286, 287, 32, 29, 266, 700/276, 44; 702/81, 182
See application file for complete search history.

(56) References Cited

U.S. PATENT DOCUMENTS

| | | | |
|---|---|---|---|
| 6,697,240 B2 | 2/2004 | Nelson et al. | |
| 6,823,253 B2 * | 11/2004 | Brunell | 701/100 |
| 8,180,622 B2 * | 5/2012 | Nasle | 703/18 |
| 2009/0112375 A1 | 4/2009 | Popescu | |
| 2011/0257956 A1 * | 10/2011 | Goel et al. | 703/18 |

OTHER PUBLICATIONS

Chaitusaney et al.,"Conflict Between Backup Generation and Recloser-Fuse Miscoordination in Reliability Aspect From Distributed Generation",Proceedings of the IASTED International Conference, Energy and Power Systems, Mar. 29-31, 2006, Chiang Mai, Thailand, 6 Pages.

Prica et al.,"A Novel Fault-Dependent-Time-Settings Algorithm for Overcurrent Relays", IEEE Student Member and Marija Ilic, Fellow, IEEE, 2009, 9 Pages.

* cited by examiner

*Primary Examiner* — Daniell L Negron
*Assistant Examiner* — Mancil Littlejohn, Jr.
(74) *Attorney, Agent, or Firm* — Jason K. Klindtworth

(57) ABSTRACT

A method and system for detection of intrusion in networked control systems, is provided. The method includes generating an operating model of a system being controlled. The operating model of the system comprises a relationship between a plurality of components in the system defined by a plurality of parameters. Further, the method includes calculating an estimated value of at least one parameter for at least one component in the system. The operating model is used to calculate the estimated value of the at least one parameter. Furthermore, the method includes measuring a latest value of at least one parameter at a predefined interval. The method also includes triggering an alert for intrusion for the at least one component based on an analysis of at least one of the latest value and the estimated value of at least one parameter.

42 Claims, 3 Drawing Sheets

METHOD AND SYSTEM FOR INTRUSION DETECTION IN NETWORKED CONTROL SYSTEMS

BACKGROUND

The present invention relates generally to the field of control systems and, more particularly, to a method and system for intrusion detection in networked control systems.

Modern day utility systems such as electricity generation and distribution systems need to be operational throughout the day and also have to remain functional continuously. The dependence of daily activities of all the applications connected to these utility systems makes it vital for the utility systems to be monitored and controlled in a timely fashion.

Considerable amount of time and resources have been invested to develop a smart infrastructure in a utility system, which communicates problems occurring in the system in near-real time. For example, control systems governing the utility systems have been equipped with communication mechanisms that communicate problems in the system to a central controller, which further checks the occurrence of the problem, and fixes it accordingly.

Stability has been achieved by treating problems occurring due to failure of components of utility systems, and other naturally occurring failures as a control problem. However smart systems face problems with intruders trying to manipulate components of the system to cause systemic failures. With the increase in communication requirements for utility systems, the risk of intrusion has increased many folds. In the recent past, the number and severity of intrusions in utility systems have adversely affected daily lives.

Although resources have been spent in finding a method to detect such intrusions, the results of these systems have not been satisfactory, since data emanated from the utility system during a natural disaster, and data made to be emanated from the system during an intrusion follow similar characteristics. For an example, it has been observed in a power distribution system that an intrusion to steal power from the power lines leads to abrupt changes in the amplitude of electrical current observed at certain points on the power lines. Similarly, abrupt changes in the electrical current readings are observed when a power fault occurs due to branch of a tree falling on the power line. Hence, there is a need for a method and system to detect intrusions in such networked control systems.

BRIEF DESCRIPTION OF THE INVENTION

In accordance with an embodiment of the invention, a method for detecting intrusion in a networked control system is provided. The method includes the step of generating an operating model of a system being controlled. The operating model of the system includes a relationship between multiple components in the system defined by multiple parameters. Further, the method includes calculating an estimated value of at least one of the plurality of parameters for at least one component in the system. The estimated value of at least one parameter is calculated using the operating model. Furthermore, the method includes measuring a latest value of the at least one parameter for the at least one component at a predefined interval. The method finally includes the step of triggering an alert for intrusion at the at least one component based on an analysis of at least one of the latest value and the estimated value of at least one of the parameters.

In accordance with another embodiment of the invention, a method for detecting intrusion in a smart grid is provided. The method includes generating an operating model of the smart grid. The operating model of the smart grid includes a relationship between multiple components in the smart grid defined by multiple parameters. Further, the method includes the step of calculating an estimated value of at least one of the plurality of parameters for at least one component in the smart grid. The estimated value of at least one parameter is calculated using the operating model of the smart grid. The method also includes the step of measuring a latest value of the at least one of the plurality of parameters at a predefined interval. Furthermore, the method includes the step of triggering an alert for intrusion at the first component based on an analysis of at least one of the latest values and the estimated value of the at least one parameter.

In accordance with yet another embodiment of the invention, a system for detection of intrusion in a smart grid is provided. The system includes a processor and multiple sensors. The processor is configured to generate an operating model of the smart grid relevant to the system's operation. The processor generated operating model of the smart grid comprises a relationship between multiple components in the smart grid defined by multiple parameters. Further, the processor is configured to calculate an estimated value of at least one parameter for at least one component in the smart grid, by utilizing the operating model of the smart grid. The processor is also configured to trigger an alert for intrusion at the first component based on an analysis of at least one of a latest value and the estimated value of at least one parameter. Multiple sensors in the system measure the latest value of the plurality of parameters at a predefined interval.

BRIEF DESCRIPTION OF THE DRAWINGS

The features and advantages of the present invention will become apparent from the following detailed description of the invention when read with the accompanying drawings in which.

DETAILED DESCRIPTION

Figure 1:
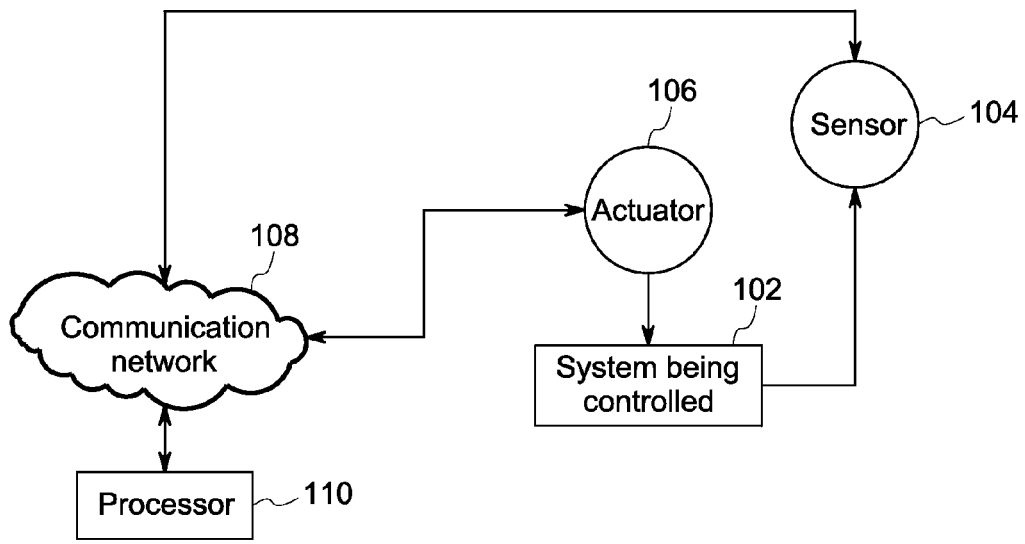
FIG. 1 is a schematic illustration of an environment where certain embodiments of the present invention can be applied.

While preferred embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

As will be discussed in detail below, embodiments of the invention include a method to detect intrusion in a networked control system. According to the method, an operating model of the system being controlled is generated. The operating model of the system being controlled includes a relationship between multiple components of the system. The relationship is defined by multiple parameters of the components. The operating model of the system being controlled is developed using general operating principles that govern the components of the system. For an example, in an energy distribution system, the operating model will be constructed using different physical laws such as the Kirchoff's Current Law, or the Kirchoff's Voltage Law. The operating model, after utilizing the physical laws, predicts the state of a particular component in the system based on a current status of another component in the system. The status of the components is expressed through the plurality of parameters. Further, an estimated value of at least one parameter for at least one component in the system is calculated. The estimated value is calculated using the operating model. Furthermore, the method includes measuring the latest value of at least one parameter. The latest value of the first parameter is calculated using multiple sensors located across the system being controlled. Finally, an alert for intrusion is triggered based on analysis of at least one of the latest value and the estimated value of at least one parameter. The analysis of the latest value and the estimated value includes, but is not limited to, statistical analysis of scalar values and vector analysis of at least one of latest value and the estimated value for more than one of the plurality of parameters. The statistical analysis includes, but is not limited to, calculating a difference between the latest value and the estimated value, determining a correlation between the latest values of the plurality of parameters, calculating a difference between the estimated values of the plurality of parameters, and calculating a difference in higher level moments of the latest values of the plurality of parameters.

Advantageous aspects of the present invention aid in detection of intrusions in networked control systems such as smart grids. The method allows controllers foresight into the behavior of components of the system and helps detect intrusion in near-real time. Once the controller is warned of an intrusion, the intrusion may be quarantined before it affects the other components in the system and causes failure across the entire system. The present invention is described in greater detail in the foregoing paragraphs with the help of accompanied drawings.

FIG. 1 is a schematic illustration of an environment where certain embodiments of the present invention can be practiced. The environment includes at least one system 102 being controlled, at least one sensor 104, at least one actuator 106, a communication network 108, and a processor 110. Examples of the system 102 being controlled, include, but are not limited to, thermal power plants, nuclear power plants, solar power plants, energy distribution networks such as a power grid or smart grid, and automobile manufacturing plants. The system 102 being controlled also includes multiple components such as, for example, turbines, valves, fuel feeder, power lines, transformers, and sub-stations. Such components exhibit a characteristic behavior at normal operating conditions. The behavior of these components is translated into multiple parameters that can be measured. Examples of the multiple parameters include temperature of the turbine, pressure at the valves in the plant, electrical current at power lines, frequency of voltage and current on power lines, voltage between two points on the power lines, phase difference between current and voltage, etc. At least one sensor 104 is configured to measure at least one parameter across the system 102 being controlled. The sensor 104 is communicably coupled with the processor 110 through the communication network 108. The processor 110 processes the measurements received from the sensor 104, and makes a decision about controlling the multiple components in the system 102 being controlled. The processor 110 sends an appropriate signal to the actuator 106 through the communication network 108, to the control the parameters.

Figure 2:
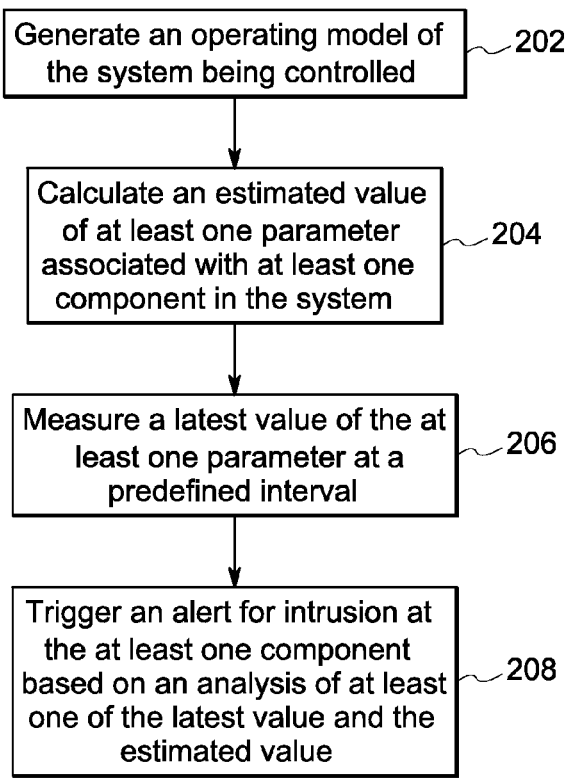
FIG. 2 is a flow chart representing an exemplary method for detecting intrusion in a networked control system, according to one embodiment of the present invention.

FIG. 2 is a flow chart for a method for detecting intrusion in a networked control system, in one embodiment. The networked control system, in certain embodiments of the present invention, can be the environment shown in FIG. 1. At step 202, in the method, an operating model of the system 102 being controlled is generated. The operating model of the system 102 includes a relationship between multiple components in the system. The relationship between the components is defined by multiple parameters. For example, in a power grid, the operating model of the power grid includes a relationship between multiple sub-stations, power lines, and transformers. The multiple parameters that govern this relationship between components of the power grid include amplitude of electrical current at different points in the power grid, the frequency of voltage and current at different points in the power grid etc. In one embodiment, an eigenanalysis of the system 102 being controlled is performed to construct the operating model of the system. The method further includes, at step 204, calculating estimated values of at least one of the plurality of parameters for at least one component in the system 102 being controlled. The estimated value of the at least one parameter is calculated using the operating model. Further, at step 206, a latest value of at least one parameter is measured. The latest value of the at least one parameter is measured at a predefined interval. Furthermore, at step 208, an alert for intrusion is triggered based on an analysis of at least one of the latest value and the estimated value of the at least one parameter.

In certain embodiments, the analysis of the latest value and the estimated value includes statistical analysis of scalar values and vector analysis of at least one of latest value and the estimated value for more than one of the plurality of parameters. The statistical analysis includes, but is not limited to, calculating a difference between the latest value and the estimated value, determining a correlation between the latest values of the plurality of parameters, calculating a difference between the estimated values of the plurality of parameters, and calculating a difference in higher level moments of the latest values of the plurality of parameters. In one embodiment of the present invention, the analysis includes comparing a difference between the latest value and the estimated value of a first parameter for a first component, with a first threshold. In another embodiment, the analysis includes determining a correlation between the latest value of a second parameter for the first component and the latest value of the first parameter. The alert for intrusion is triggered when the latest values for the first and second parameter at the first component do not show the relationship anticipated by the operating model.

In another embodiment, the latest value of the first parameter for the first component in the system 102 being controlled is used to modify the operating model. The analysis for triggering an alert for intrusion also includes comparing estimated value of the first parameter for the first component in the system 102 being controlled and estimated value of the first parameter for a second component in the system 102 being controlled. When the estimated values of the first parameter for the first and second component in the system 102 do not match, an alert for intrusion is triggered.

In one embodiment, the latest value of the first parameter at the first component is communicated to the second component in the system 102 being controlled. The communication between the first and second component in the system 102 happens through the networked control system. For example, as shown in FIG. 1, the communication between components may occur through the communication network 106. The communication network 106 can either be wired, or wireless, or any other known means of communication, or combinations thereof. Furthermore, at the second component of the system 102, the latest values of the first parameter at the first component and the second component are compared. In one embodiment, the alert for intrusion is triggered for at least one of the first and second component of the system 102, when the difference between the latest value of the first parameter at the first and second component is greater than a second threshold. In another embodiment, all components from the plurality of components in the system 102 being controlled communicate the latest value of the first parameter to the first component. The first component, depending on the analysis of the latest value of the first parameter for the plurality of components, generates an alert for intrusion at the respective components. In another embodiment, the latest values for the plurality of components are communicated to the processor 110. The processor 110 analyzes the latest values and generates the alert for intrusion at respective components. In yet another embodiment, each of the plurality of components transmits their latest value of the first parameter to neighboring components. The alert for intrusion is triggered when the latest values do not follow the operating model of the system 102 being controlled. In yet another embodiment, the alert for intrusion is triggered when the latest value of the first parameter is greater than the first threshold for more than one component, for example, for both the first and second component of the system 102 being controlled.

In another embodiment, the difference between the estimated and latest value of the first parameter at the first component is compared with historical data pertaining to differences between the estimated and latest value of the plurality of parameters. If the electrical current difference matches with a historical data entry about difference that is linked with a historical intrusion event, an alert for intrusion is triggered.

In an exemplary embodiment of a power grid, the method for detecting intrusion includes, building an operating model of the power grid. The operating model of the power grid includes a relationship between components such as, power generating source, sub-station, transformers, power lines, and metering equipment. The relationship between these components is established through parameters such as electrical current, voltage, frequency of oscillation etc. Taking the exemplary embodiment further, an estimated value of electrical current at a first transformer in the power grid is calculated using the operating model, and a latest value of at least one other parameter such as voltage between two points of the power line connecting the power generation source with the transformer. Further, a latest value of electrical current is measured at the transformer and compared with the estimated value. If the difference between the estimated value and the latest value of electrical current at the first transformer is greater than a threshold, an alert for intrusion is triggered. The alert for intrusion may be delivered via any known alert systems. Non-limiting examples of alert systems include acoustic or visible sirens, e-mails, text messages, and the like.

Figure 3:
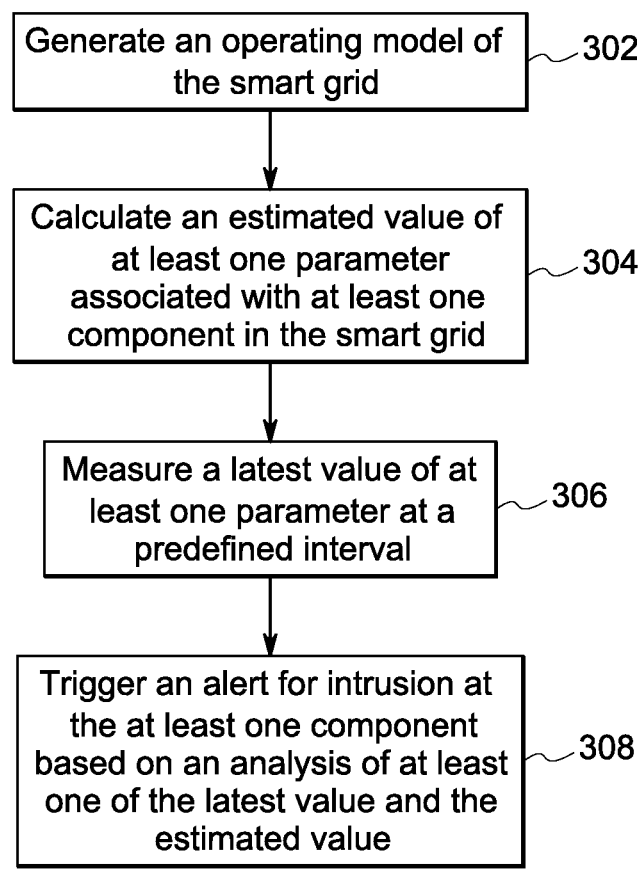
FIG. 3 is a flow chart representing an exemplary method for detecting intrusion in a smart grid, according to another embodiment of the present invention.

In another embodiment, the system 102 being controlled may be a smart grid. FIG. 3 illustrates a flowchart for a method for detection of intrusion in a smart grid. The method, at step 302, includes generating an operating model of the smart grid. The operating model of the smart grid is a relationship between multiple components of the smart grid. The relationship between the multiple components in the smart grid is defined by multiple parameters. The multiple components in the smart grid, include, but are not limited to, power generating sources, sub-stations, transformers, power lines, communication network, reclosers, and metering equipment. In the operating model of the smart grid, a relationship between these components, for example via electrical current flow, is established. Further, at step 304, an estimated value of at least one parameter at at least one component is calculated. The estimated value of at least one parameter is calculated using the operating model. For example, an estimated value of electrical current at one recloser on a power line in the smart grid is calculated using the operating model. Furthermore, at step 306, a latest value of at least one parameter is measured. The measurement is carried out at each predefined interval. For example, according to the method, a latest value of the electrical current at one recloser is measured. Finally, at step 308, at least one of the estimated value and latest value of the at least one parameter is analyzed and an alert for intrusion is triggered based on the analysis. In one embodiment, the operating model of the smart grid is generated by performing an eigenanalysis of the smart grid. Further, general operating principles governing each of the components are used to generate the operating model.

In certain embodiments, the analysis of the latest value and the estimated value includes statistical analysis of scalar values and vector analysis of at least one of latest value and the estimated value for more than one of the plurality of parameters. The statistical analysis includes, but is not limited to, calculating a difference between the latest value and the estimated value, determining a correlation between the latest values of the plurality of parameters, calculating a difference between the estimated values of the plurality of parameters, and calculating a difference in higher level moments of the latest values of the plurality of parameters. In one embodiment of the present invention, the analysis includes comparing a difference between the latest value and the estimated value of a first parameter for a first component, with a first threshold. In another embodiment, the analysis includes determining a correlation between the latest value of a second parameter for the first component and the latest value of the first parameter. The alert for intrusion is triggered when the latest values for the first and second parameter at the first component do not show the relationship anticipated by the operating model.

In another embodiment, the latest value of the first parameter for the first component in the smart grid is used to modify the operating model. The analysis for triggering an alert for intrusion also includes comparing estimated value of the first parameter for the first component in the smart grid and estimated value of the first parameter for a second component in the smart grid. When the estimated values of the first parameter for the first and second component in the smart grid do not match, an alert for intrusion is triggered.

In one embodiment, the latest value of the first parameter at the first component is communicated to the second component in the smart grid. The communication between the first and second component in the smart grid happens through the communication network. The communication network can either be wired, or wireless, or any other known means of communication, or combinations thereof. For example, the latest value of electrical current at the first recloser is communicated to a second recloser on the power line through a wireless communication network. Furthermore, at the second component of the smart grid, the latest values of the first parameter at the first component and the second component are compared. In one embodiment, the alert for intrusion is triggered for at least one of the first and second component of the smart grid, when the difference between the latest value of the first parameter at the first and second component is greater than a second threshold. In another embodiment, all components from the plurality of components in the system 102 being controlled communicate the latest value of the first parameter to the first component. The first component, depending on the analysis of the latest value of the first parameter for the plurality of components, generates an alert for intrusion at the respective components. In another embodiment, the latest values for the plurality of components are communicated to a remotely located processor. The processor analyzes the latest values and generates the alert for intrusion at respective components. In yet another embodiment, each of the plurality of components transmits their latest value of the first parameter to neighboring components. The alert for intrusion is triggered when the latest values do not follow the operating model of the smart grid.

In an exemplary embodiment, if the latest value of electrical current at the first recloser is 10A, it is expected that the second recloser that is placed downstream on the same power line as the first recloser, should experience the same electrical current (assuming impedance losses on the power line are negligible). If the electrical current at the second recloser is less than or greater than 10A experienced at the first recloser, an alert for intrusion is triggered for at least one of the first or second recloser. In another exemplary embodiment, the first recloser on the power line experiences electrical current greater than the first threshold. In normal operation, the first recloser switches off and switches on a segment of the power line to check if the electrical current returns to the estimated value of electrical current at the first recloser. When the first recloser continues to experience electrical current greater than the first threshold, the first recloser communicates with the other reclosers present on the power line and that follow the first recloser in the electrical current flow direction. The reclosers on the power line communicate with each other to verify the occurrence of an intrusion. For an example, if only the first recloser experiences electrical current greater than the first threshold, an alert for potential intrusion is triggered at the first recloser.

In another embodiment, an alert for intrusion is triggered when the latest value of the first parameter is greater than the first threshold for more than one component in the smart grid. For example, if the first threshold for electrical current at reclosers is 10A, and the latest value of electrical current at first, second, and third recloser is 15A, an alert for intrusion is triggered.

In yet another embodiment, the difference between the latest measured and estimated value of the first parameter for the first component is compared with historical data pertaining to differences between latest measured and estimated values of the plurality of parameters. If the electrical current difference matches with a historical record about difference that is linked with a historical intrusion event, an alert for intrusion is triggered. For example, if the electrical current difference between latest measured and estimated values of electrical current at the first recloser is 10A, and in the historical data if there is an intrusion event associated with 10A of difference between estimated and latest values, an alert for intrusion is triggered.

Figure 4:
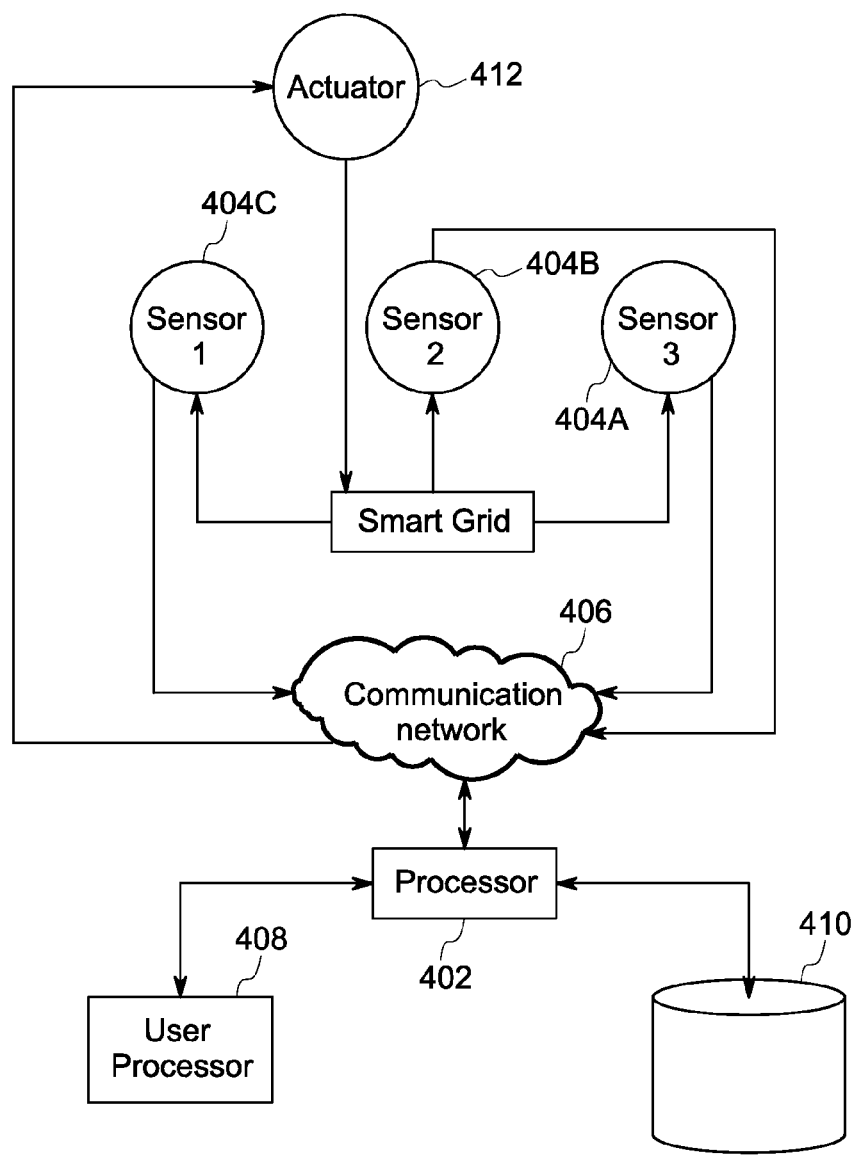
FIG. 4 is a block diagram representation of a system for detection of intrusion in a smart grid, according to another embodiment of the present invention.

FIG. 4 illustrates a system to detect intrusion in a smart grid. The system includes a processor 402, and multiple sensors 404A, 404B, and 404C. Further, The system also includes at least one actuator 412. The actuator 412 controls the operation of the smart grid, based on inputs received from the processor 412. The processor 402 is communicably coupled with the smart grid, the at least one actuator 412 and the multiple sensors through a communication network 406. The processor 402 is configured to generate an operating model of the smart grid. The operating model of the smart grid includes a relationship between multiple components in the smart grid. The multiple components in the smart grid are related to each other through multiple parameters. The processor 402 is further configured to calculate an estimated value for at least one parameter of at least one component in the smart grid. The processor 402 calculates the estimated value of the at least one parameter for the at least one component using the operating model of the smart grid. Furthermore, the processor 402 is configured to trigger an alert for intrusion at the at least one component based on an analysis of at least one of the estimated value and a latest value of the at least one parameter. The multiple sensors 404A, 404B, and 404C are configured to measure a latest value of the multiple parameters, at a predefined interval. The processor 402 generates the operating model of the smart grid using general operating principles that govern the multiple components in the smart grid.

In one embodiment, the multiple sensors 404A, 404B, and 404C communicate the latest value of the plurality of parameters to the processor 402 through the communication network 406. The multiple sensors 404A, 404B, and 404C can either continuously send latest values of the parameters to the processor 402 or can send latest values of the parameters to the processor when the latest value of the parameters exceeds a local threshold for the parameters.

In certain embodiments, the analysis of the latest value and the estimated value includes statistical analysis of scalar values and vector analysis of at least one of latest value and the estimated value for more than one of the plurality of parameters. The processor 402 is configured to perform statistical analysis that includes, but is not limited to, calculating a difference between the latest value and the estimated value, determining a correlation between the latest values of the plurality of parameters, calculating a difference between the estimated values of the plurality of parameters, and calculating a difference in higher level moments of the latest values of the plurality of parameters. In one embodiment of the present invention, the analysis performed by the processor 402 also includes comparing a difference between the latest value and the estimated value of a first parameter for a first component, with a first threshold. In another embodiment, the analysis includes determining a correlation between the latest value of a second parameter for the first component and the latest value of the first parameter. The alert for intrusion is triggered when the latest values for the first and second parameter at the first component do not show the relationship anticipated by the operating model.

In another embodiment, the processor 402 uses the latest value of the first parameter for the first component in the smart grid to modify the operating model. The analysis for triggering an alert for intrusion also includes comparing estimated value of the first parameter for the first component in the smart grid and estimated value of the first parameter for a second component in the smart grid. When the estimated values of the first parameter for the first and second component in the smart grid do not match, the processor 402 triggers an alert for intrusion at at least one of the first and second component in the smart grid.

In one embodiment, the system includes a user interface 408 configured to receive values pertaining to the first threshold. The user interface 408 is also used by a user to feed the value of the predefined interval for measuring the latest values of the multiple parameters. Further, the user interface is also configured to display an alert for intrusion and the component at which the intrusion has occurred. The alert can be displayed on the user interface as a graphical symbol, or as a text message.

In another embodiment, the processor 402 is located at a station that is remote to the smart grid. The processor 402 and the smart grid communicate through the communication network 406. The communication network 406 can either be through a wireless connection, or through a wired connection, or any other known means of communication, or combinations thereof. The processor 402 is configured to receive a latest value of the first parameter for the second component in the smart grid. Furthermore, at the second component of the smart grid, the latest values of the first parameter at the first component and the second component are compared. In one embodiment, the processor 402 triggers an alert for intrusion for at least one of the first and second component of the smart grid, when the difference between the latest value of the first parameter at the first and second component is greater than a second threshold.

In another embodiment, all components from the plurality of components in the system 102 being controlled communicate the latest value of the first parameter to the processor 402. The processor 402, depending on the analysis of the latest value of the first parameter for the plurality of components, generates an alert for intrusion for respective components. The processor 402 analyzes the latest values and generates the alert for intrusion at respective components. In yet another embodiment, In yet another embodiment, at least one of the multiple components of the smart grid includes the processor 402. In this embodiment, each of the plurality of components transmits their latest value of the first parameter to neighboring components. The alert for intrusion is triggered when the latest values do not follow the operating model of the smart grid. The processor 402 is also configured to trigger an alert for intrusion when the latest value of first parameter is greater than the first threshold for more than one component in the smart grid.

In one embodiment, the system includes a knowledge repository 408. The knowledge repository 408 includes historical data pertaining to differences between the estimated and latest values of the each of plurality of parameters, and information pertaining to an historical intrusion event in the smart grid for each historical data entry. The processor 402 is configured to compare the electrical current difference between the latest measured and estimated values of the first parameter of the smart grid, with historical data pertaining to analysis of at least one of the latest measured and estimated values of the plurality of parameters. If the electrical current difference matches with at least one entry from the historical data, an alert for intrusion is triggered.

The various embodiments of system and method to detect intrusions in a networked control system described above thus provide near real-time automated detection of intrusions, by utilizing general operating principles of the components of the system being controlled. The system and method help operators to isolate a cyber-intrusion at its origin and quarantine the intrusion before it affects the other components in the system being controlled. Further, the method utilizes the smart infrastructure in a networked control system to enable components in the system being controlled to treat an intrusion locally without any intervention from a central processor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description.

The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for detecting intrusion in a networked control system, the method comprising:
   generating an operating model of the system being controlled, wherein the operating model of the system comprises a relationship between a plurality of components in the system defined by a plurality of parameters;
   calculating an estimated value for a first parameter of the plurality of parameters at a first and a second component in the system, using the operating model;
   measuring a latest value for the first parameter at the first and second component in the system at a predefined interval;
   analyzing the estimated value and the latest value for the first parameter at the first component and the latest value of the first parameter at the second component, wherein the analysis comprises
      comparing a first threshold with a difference between the latest value and the estimated value of the first parameter for the first component in the system, and
      comparing a second threshold with a difference between the latest value of the first parameter at the first component and a latest value of the first parameter at the second component in the system; and triggering an alert for intrusion at the first or second component when a difference between the latest value and the estimated value of the first parameter at the first component is greater than the first threshold or when a difference between the latest value of the first parameter at the first component and the latest value of the first parameter at the second component is greater than the second threshold.

2. The method as recited in claim 1, wherein the analysis further comprises determining a correlation between the latest value of a second parameter for the first component in the system and the latest value of the first parameter for the first component.

3. The method as recited in claim 1, wherein the analysis further comprises comparing estimated values of the first parameter for the first component in the system with estimated values of the first parameter for the second component in the system.

4. The method as recited in claim 1, wherein the analysis further comprises a vector comparison of at least two parameters for the at least one component in the system.

5. The method as recited in claim 3 further comprising communicating the latest value of the first parameter of the first component of the system to the second component in the system through the networked control system.

6. The method as recited in claim 5 further comprising comparing, at the second component in the system, the latest value of the first parameter at the first component with the latest value of the first parameter at the second component in the system.

7. The method as recited in claim 1 further comprises generating the operating model of the system being controlled on the basis of an eigen analysis of the system being controlled.

8. The method as recited in claim 1 further comprises updating the operating model based on the latest values of the first parameter.

9. The method as recited in claim 1 further comprises triggering the alert for intrusion when the latest value of the first parameter is greater than the first threshold for more than one component in the system being controlled.

10. The method as recited in claim 1 further comprises comparing the difference between the estimated value of the first parameter, and the latest value of the first parameter with historical data pertaining to differences between the estimated and latest value of the plurality of parameters.

11. The method as recited in claim 10 further comprises triggering the alert for intrusion when the historical data matching the difference between the latest measured and estimated value of the first parameter is linked to a historical intrusion event faced by the system being controlled.

12. The method as recited in claim 1, wherein the system being controlled is a power grid.

13. The method as recited in claim 12, wherein the plurality of components in the power grid comprise at least one power generating source, at least one sub-station, at least one transformer, at least one power line, and at least one metering equipment.

14. The method as recited in claim 13, wherein the plurality of parameters comprise amplitude of electrical current, frequency, impedance on power lines, voltage at two points on the power line, and oscillation frequency of the power grid.

15. The method as recited in claim 1, wherein the system being controlled is a smart grid.

16. A method for detecting intrusion in a smart grid, the method comprising:

generating an operating model of the smart grid, wherein the operating model of the smart grid comprises a relationship between a plurality of components in the smart grid defined by a plurality of parameters;

calculating an estimated value for a first parameter from the plurality of parameters at a first and a second component in the smart grid, using the operating model;

measuring a latest value for the first parameter at the first and the second component in the smart grid at a predefined interval;

analyzing the estimated value and the latest value for the first parameter at the first component and the latest value of the first parameter at the second component, wherein the analysis comprises comparing a first threshold with a difference between the latest value and the estimated value of the first parameter for the first component in the system, and comparing a second threshold with a difference between the latest value of the first parameter at the first component and a latest value of the first parameter at the second component in the system; and triggering an alert for intrusion at the first or second component when a difference between the latest value and the estimated value of the first parameter at the first component is greater than the first threshold or when a difference between the latest value of the first parameter at the first component and the latest value of the first parameter at the second component is greater than the second threshold.

17. The method as recited in claim 16 further comprises generating the operating model of the smart grid based on general operating principles of the plurality of components in the smart grid.

18. The method as recited in claim 17 further comprises updating the operating model of the smart grid based on latest value of the at least one of plurality of parameters.

19. The method as recited in claim 16, wherein the analysis further comprises determining a correlation between the latest value of a second parameter for the first component in the system and the latest value of the first parameter.

20. The method as recited in claim 16, wherein the analysis further comprises comparing estimated values of the first parameter for the first component in the system with estimated values of the first parameter for the second component in the system.

21. The method as recited in claim 16, wherein the analysis further comprises a vector comparison of at least two parameters for at least one component in the system.

22. The method as recited in claim 16 further comprising communicating the latest value of the first parameter of the first component of the smart grid to the second component in the smart grid.

23. The method as recited in claim 22 further comprising comparing, at the second component in the smart grid, the latest value of the first parameter at the first component with the latest value of the first parameter at the second component in the smart grid.

24. The method as recited in claim 16 further comprises triggering the alert for intrusion when the latest value of the first parameter is greater than the first threshold for more than one component in the smart grid.

25. The method as recited in claim 16 further comprises comparing the difference between estimated value of the first parameter, and the latest value of the first parameter with historical data pertaining to differences between the estimated and latest value of the plurality of parameters.

26. The method as recited in claim 25 further comprises triggering the alert for intrusion when the historical data matching the difference between the latest measured and estimated value of the first parameter is linked to a historical intrusion event faced by the smart grid.

27. The method as recited in claim 16, wherein the plurality of components in the smart grid comprise at least one power generating source, at least one sub-station, at least one transformer, at least one power line, at least one recloser, at least one communication network, and at least one metering equipment.

28. The method as recited in claim 16, wherein the plurality of parameters comprise amplitude of electrical current, frequency, impedance on power lines, voltage at two points on the power line, amplitude of electrical current at reclosers in the smart grid, and oscillation frequency of the smart grid.

29. A method for detecting intrusion in a smart grid, the method comprising:
  generating an operating model of the smart grid, wherein the operating model of the smart grid comprises a relationship between a plurality of components in the smart grid defined by a plurality of parameters;
  calculating an estimated value for a first parameter from the plurality of parameters at a first and a second component in the smart grid, using the operating model;
  measuring a latest value for the first parameter at the first and the second component in the smart grid at a predefined interval;
  analyzing the estimated value and the latest value for the first parameter at the first component and the latest value of the first parameter at the second component, wherein the analysis comprises
    comparing a first threshold with a difference between the latest value and the estimated value of the first parameter for the first component in the system, and
    comparing a second threshold with a difference between the latest value of the first parameter at the first component and a latest value of the first parameter at the second component in the system; and
  triggering an alert for intrusion at the first or second component when a difference between the latest value and the estimated value of the first parameter at the first component is greater than the first threshold or when a difference between the latest value of the first parameter at the first component and the latest value of the first parameter at the second component is greater than the second threshold.

30. The system as recited in claim 29, wherein the analysis further comprises determining a correlation between the latest value of a second parameter for the first component in the system and the latest value of the first parameter for the first component.

31. The system as recited in claim 29, wherein the analysis further comprises comparing estimated values of the first parameter for the first component in the system with estimated values of the first parameter for the second component in the system.

32. The method as recited in claim 29, wherein the analysis further comprises a vector comparison of at least two parameters for the at least one component in the system.

33. The system as recited in claim 29 further comprises a user interface configured to
  receive, from a user, values pertaining to the first threshold, second threshold and the predefined interval; and
  display the alert for intrusion at the at least one component of the smart grid, to the user.

34. The system as recited in claim 29, wherein the plurality of components in the smart grid comprise at least one power generating source, at least one sub-station, at least one transformer, at least one power line, reclosers, at least one communication network, and at least one metering equipment.

35. The system as recited in claim 34, wherein the plurality of parameters comprise amplitude of electrical current, frequency, impedance on power lines, voltage at two points on the power line, amplitude of electrical current at the reclosers in the smart grid, and oscillation frequency of the smart grid.

36. The system as recited in claim 29, wherein the processor generates the operating model of the smart grid based on general operating principles of the plurality of components in the smart grid.

37. The system as recited in claim 29, wherein the processor is further configured to trigger the alert for intrusion when the latest value of the first parameter is greater than the first threshold for more than one component in the smart grid.

38. The system as recited in claim 29 further comprises a knowledge repository that comprises historical data pertaining to differences between the estimated and latest values of the plurality of parameters, and information pertaining to a historical intrusion event faced by the smart grid for each historical data entry.

39. The system as recited in claim 38, wherein the processor is further configured to trigger the alert for intrusion when the difference between the estimated and latest value of the first parameter matches at least one entry from the historical data stored in the knowledge repository.

40. The system as recited in claim 29 wherein the plurality of components in the smart grid are communicably coupled with each other through the at least one communication network.

41. The system as recited in claim 29, wherein the processor is a remotely located processor that is communicably coupled with the plurality of components of the smart grid.

42. The system as recited in claim 29, wherein at least one of the plurality of components of the smart grid comprises the processor.

* * * * *